G. W. CONLEE.
Relishing-Machine.
No. 164,427.    Patented June 15, 1875.
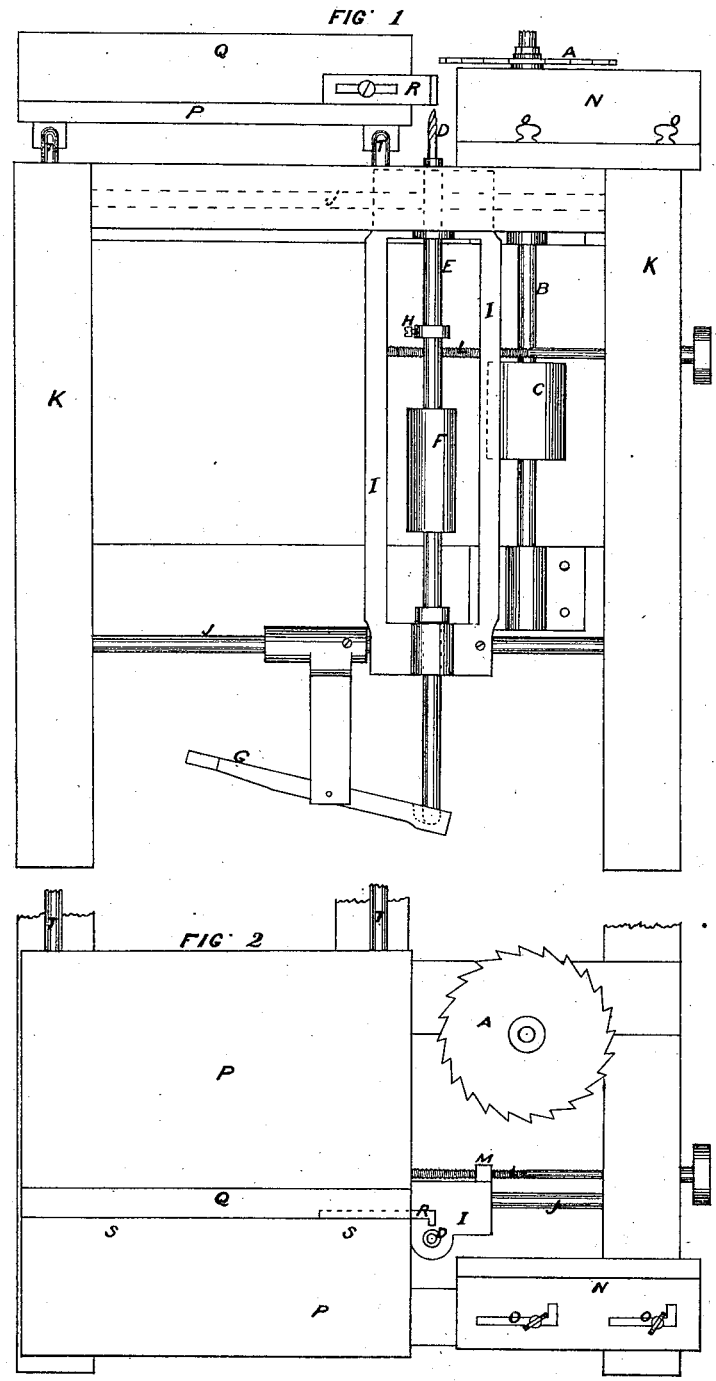

UNITED STATES PATENT OFFICE.

GEORGE W. CONLEE, OF OSHKOSH, WISCONSIN, ASSIGNOR OF ONE-THIRD HIS RIGHT TO HIRAM H. DYER, OF SAME PLACE.

IMPROVEMENT IN RELISHING-MACHINES.

Specification forming part of Letters Patent No. 164,427, dated June 15, 1875; application filed April 21, 1875.

*To all whom it may concern:*

Be it known that I, GEORGE W. CONLEE, of Oshkosh, county of Winnebago, State of Wisconsin, have invented an Improvement in Relishing-Machines, of which the following is a specification:

The nature of my invention relates to a combination of devices for relishing and sizing the tenons of sash, blind, or other rails.

The butt of these tenons is sometimes in a beveled recess that cannot be reached with a saw, and to cut off the heel of the relish I use an adjustable bit, and then pass the rail along to a saw which slits off the relish, making the tenon of any required size, according to the height of the saw on its shaft, and the combination of these devices, and the means of adjusting them to each other and to any thickness or size of tenon, constitute what I claim as my invention.

Figure 1 is an elevation, and Fig. 2 is a plan view, of my invention.

A is the saw for relishing the tenon, attached to shaft B, and operated by a belt on pulley, C. D is the bit fixed in shaft E, and operated by a belt on pulley, F.

To bore the heel of the relish, the shaft E and bit are raised by a treadle, G, the depth of the bore being gaged by an adjustable collar, H, provided with a set-screw.

The frame I, in which the bit-shaft revolves, is adjustable transversely on rods J J, or it may be attached to and adjustable by means of slots and set-screws on the frame K K of the machine. L is an adjusting-screw, for fixing accurately the position of the bit. It acts in a nut, M, attached to the frame I, and is fastened to the frame K of the machine. N is an adjustable stop, provided with slots and set-screws O O, so that it may be set for tenons of varying thickness. The carrying-table P has a stop, Q, to which is attached an adjustable sliding stop, R, against the lip of which the shoulder of the tenon is placed.

A tenon being ready for relishing, the rail is laid on the carrier P at S S, against the stop Q, the sliding stop R, adjustable stop N, and bit being relatively so adjusted by the devices described, as to bring the bit directly under the heel of the tenon, when, by operating the treadle, the bit bores the heel of the relish. Still holding the rail in the same position, the carrying-table P is moved along the guides T T, bringing the tenon to the saw A, which slits off the relish, the saw having been previously adjusted at the proper height on its shaft by means of collars and washers.

Having thus described my invention, what I claim as new, and desire to secure by Letters Patent, is—

The adjustable bit-shaft E, and adjusting-screw L with treadle G and adjustable collar H, the adjustable stops N and R, and the adjustable slitting-saw A, all combined substantially as shown and described, for the purpose specified.

GEORGE W. CONLEE.

Witnesses:
E. PALMER,
J. R. WASHBURN.